United States Patent
Briau

(10) Patent No.: US 6,336,628 B1
(45) Date of Patent: Jan. 8, 2002

(54) DISK STACK HOLDER

(76) Inventor: Marc Briau, 21 Chemin Richelieu, RR101, St-Mathias, Québec (CA), J3l 6A1

( * ) Notice: Subject to any disclaimer, the term of this patent is extended or adjusted under 35 U.S.C. 154(b) by 0 days.

(21) Appl. No.: 09/666,727

(22) Filed: Sep. 20, 2000

(51) Int. Cl.[7] .................................................. B23Q 1/00
(52) U.S. Cl. ......................... 269/47; 269/238; 269/224
(58) Field of Search ............................ 269/47, 52, 228, 269/234, 157, 158

(56) References Cited

U.S. PATENT DOCUMENTS

| | | | | |
|---|---|---|---|---|
| 4,641,821 A | * | 2/1987 | Jaworski | 269/234 |
| 5,318,391 A | * | 6/1994 | Breiner | 269/47 |
| 5,637,200 A | * | 6/1997 | Tsymberov | 204/298.15 |
| 5,824,388 A | * | 10/1998 | Freund | 269/47 |
| 5,882,555 A | * | 3/1999 | Ronoe et al. | |
| 5,904,349 A | * | 5/1999 | Dykstra | 269/228 |
| 5,961,108 A | * | 10/1999 | Weber | 269/138 |
| 6,003,851 A | * | 12/1999 | Araki | 269/239 |
| 6,022,009 A | * | 2/2000 | Hill | 269/47 |
| 6,164,634 A | * | 12/2000 | Farlow | 269/47 |

* cited by examiner

Primary Examiner—Derris H. Banks
Assistant Examiner—Daniel Shanley

(57) ABSTRACT

A portable disk stack holder has a support with a base on the support and with a disk mounting pin slidable through aligned holes in the base and support with one end of the pin within the support and the other end of the pin above the base. The one end of the pin is connected to a lever mechanism for pulling the pin downwardly. A presser plate is detachably connected to the other end of the pin. Operating the lever mechanism will pull the pin down pulling the presser plate toward the base to tightly clamp a stack of disks mounted on the pin between the plate and the base.

18 Claims, 8 Drawing Sheets

DISK STACK HOLDER

BACKGROUND OF THE INVENTION

1. Field of the Invention

This invention is directed toward a work holder for holding a stack of disks to be worked on. The invention is more particularly directed toward a work holder for holding a stack of circular disks with a central mounting opening, such as CD disks and the like, the disks in the held stack to be worked in one operation to have a shape other than circular.

2. Description of the Related Art Including Information Disclosed Under CFR §1.97–1.99

It is known to provide CD disks in various shapes instead of the normal circular shape. A circular disk, with a central mounting opening and an annular section of recorded material on one side of the disk, concentric about the opening, is shaped by cutting or abrading to a new shape, other than circular, with the annular section of recorded material within the new shape. Usually, a plurality of circular disks are arranged in a stack and shaped in one operation to provide the disks in the stack with the new shape. The disks are usually stacked on a central pin via the central mounting opening and a nut is threaded onto the pin at the top to hold the stack in place. Alternatively, a collar may be mounted on the pin, pressed against the top of the stack, and locked to the pin with a set screw. However, it is a problem to hold the stack tight enough, without damaging the disks, so that the disks do not move during the shaping operation. Often one or more disks in the stack move during the shaping operation resulting in rejects and thus increasing production costs. It also takes time to mount the stacks.

SUMMARY OF THE INVENTION

It is the purpose of the present invention to provide a holder for a stack of disks which securely hold the disks during a shaping operation without damage to the disks. It is another purpose of the present invention to provide a holder for a stack of disks which can be quickly and easily loaded and unloaded with the stack of disks; and which holds each stack of disks, to be shaped, consistently with the same preselected force. It is another purpose of the present invention to provide a holder for a stack of disks which is compact and easily movable; and also which is quickly and easily located in the proper position at a work station so the stack of disks can be shaped.

In accordance with the present invention there is provided a disk stack holder having a support with a raised base on the support. A disk mounting pin slides through a hole in the base and support. One end of the pin, in the support, has connection means for use in connecting the pin to a pulling means. The other end of the pin, above the base, has a presser plate. A stack of disks are concentrically mounted about the pin between the top of the base and the presser plate. The pulling means are then actuated to draw the presser plate toward the base, and to lock it in position, to hold the stack tight between the presser plate and the base.

Preferably the other end of the pin has a stop. The presser plate has an opening shaped to allow it to be mounted on the pin over the stop and then moved laterally to have the stop prevent its withdrawal back off the pin. This construction allows the disks to be easily and quickly loaded onto, and removed from, the pin. Preferably the stop is adjustable toward or away from the other end of the pin. This allows the force, with which the holder clamps the stack of disks, to be adjusted.

The pulling means preferably has a cam member connected to the pin adjacent the one end of the pin. Movement of the cam member, in one direction transverse to the pin, will cam the pin downwardly to compress the stack between the presser plate and the base to securely hold the stack so that the disks in the stack can be shaped in one operation. Movement of the cam member in the opposite direction to the one direction will allow the pin to move upwardly to unlock the stack allowing it to be removed. The cam member is preferably moved by a lever mechanism located primarily outside the support.

The bottom of the support is preferably recessed with a seal around the recess. The recess is used to mount the holder on a pad on a table at a work station, the pad locating the holder in the correction position relative to the shaping tool, with the seal contacting the table. The recess is shaped and sized relative to the pad to provide a thin chamber between the pad and the bottom of the recess. Air can be withdrawn from this chamber, through the pad, to hold the holder in the correct position on the pad by suction.

The invention is particularly directed toward a disk stack holder having a support with a base thereon. A disk mounting pin slides through a hole in the base and the support with one end of the pin within the support. The other end of the pin is above the base. Connecting means are provided at the one end of the pin for use in connecting the pin to a pulling means. A presser plate is provided at the other end of the pin. The pulling means can pull the pin down pulling the presser plate toward the base to tightly clamp, and lock, a stack of disks on the pin between the presser plate and the base.

DESCRIPTION OF THE PREFERRED EMBODIMENTS

Figure 1:
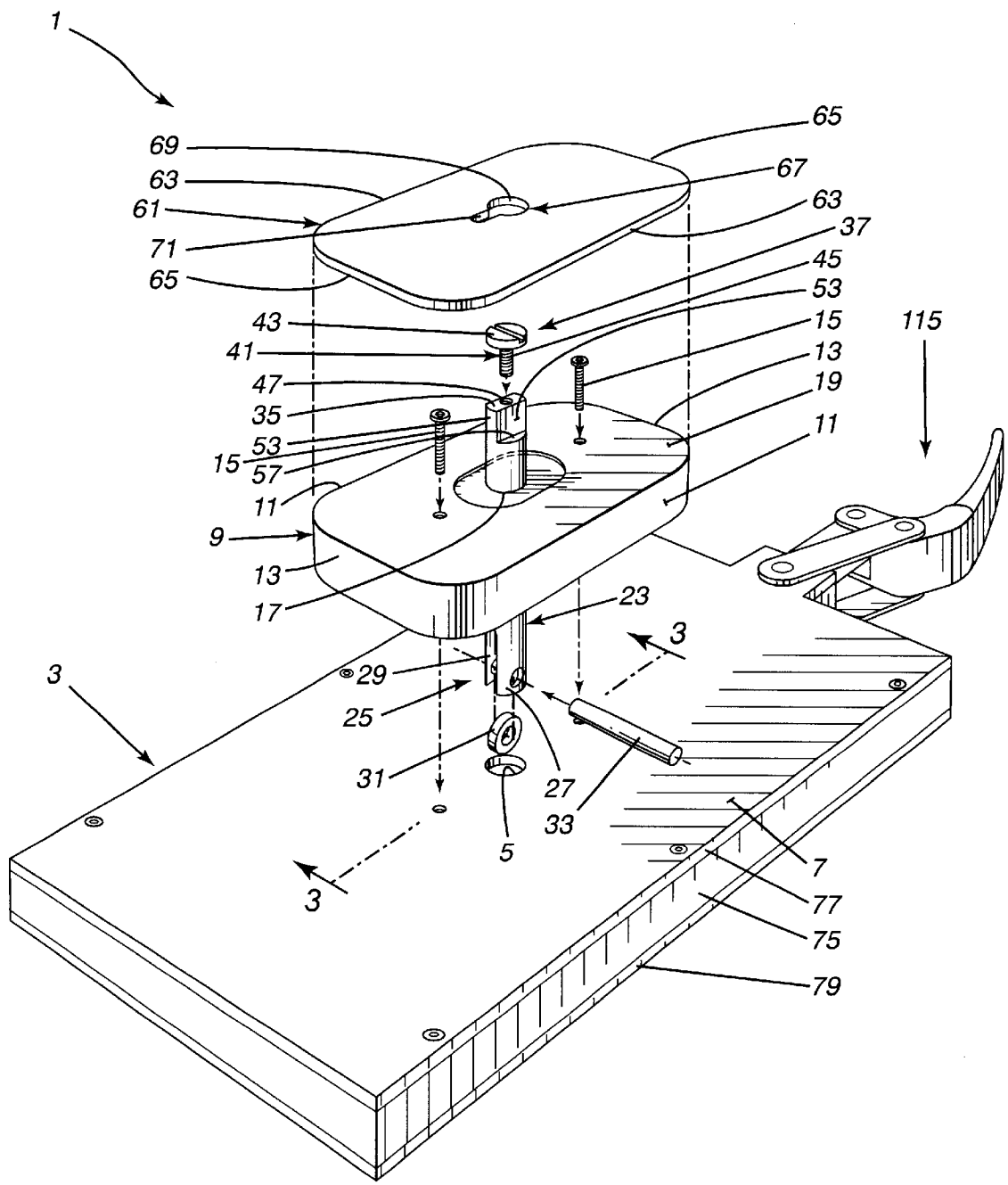
FIG. 1 is an exploded view of the holding means.
Figure 2:
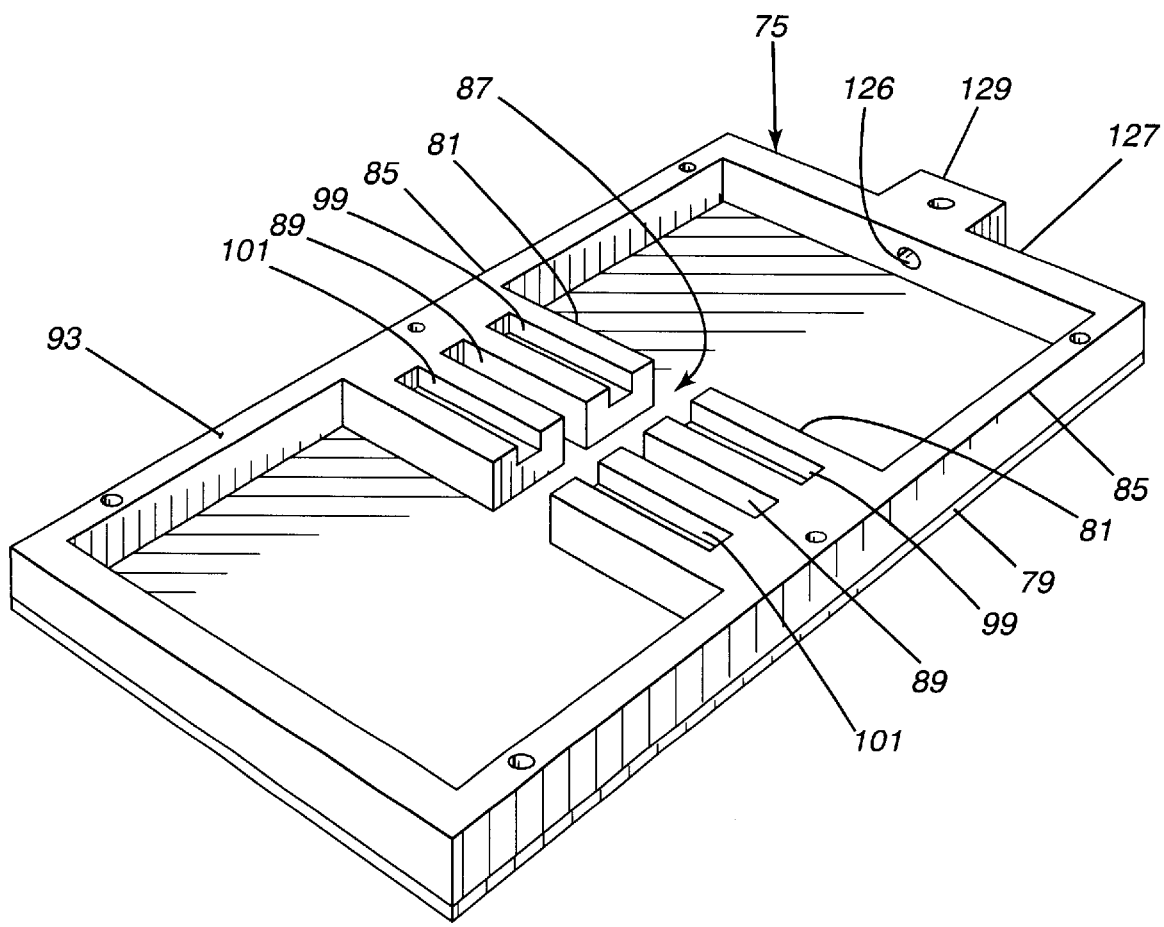
FIG. 2 is a perspective view of the support with the top wall and the pulling mechanism removed.
Figure 3:
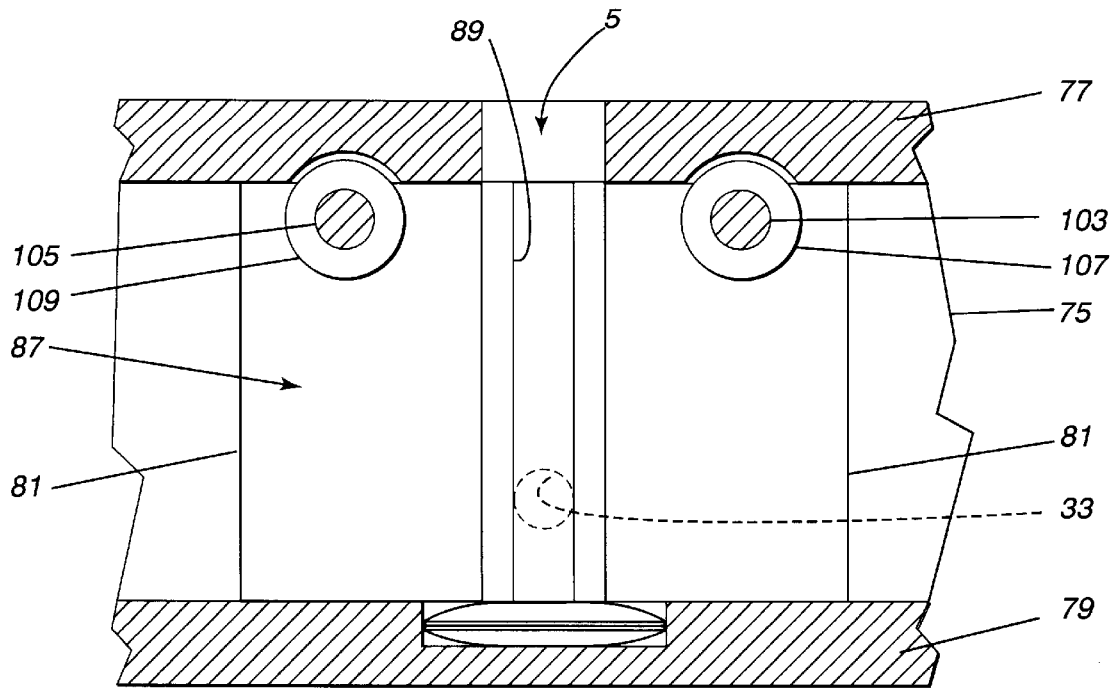
FIG. 3 is cross section view taken along line 3—3 in FIG. 1 with the cam member removed.

The disk stack holder 1, as shown in FIGS. 1 to 3, has a support 3 in the shape of a relatively thick pad with a generally rectangular planar shape. The support 3 is hollow, as will be described, and has a central hole 5 in its top surface 7 providing access to the interior of the support. The holder 1 also has a base 9, smaller than the support 3, and in the same general shape as the final shape of the disks when they are cut but slightly smaller. In the embodiment shown, the base 9 is in the shape of a generally rectangular block with parallel sides 11 and slightly rounded ends 13. The base 9 is centrally mounted on top surface 7 of the support 3 by suitable fastening means 15. The base 9 has a through central hole 17. The hole 17 extends perpendicularly to the top surface 19 of the base 9 and is aligned with the hole 5 in the support 3 when the base 9 is fastened to the support. The base 9 has been shown as a separate member from the support 3. It is preferred that the base 9 be a separate member from the support 3 so that it can be easily changed with bases of different shape to have the base fit the shape that the disks are being cut to. The base 9 however can be an integral part of the support 3 if desired, particularly if only one shape of disk is to be formed.

The holder 1 has a disk mounting pin 23 of generally cylindrical shape. The pin 23 is sized to snugly slide through the aligned holes 5, 17 in the support 3 and base 9. The pin 23 has connecting means 25 at the one end 27 that is inserted through the holes 5, 17 into the interior of the support 3. The connecting means 25 can have a slot 29, aligned with the longitudinal axis of the pin 23, the slot 29 extending through the pin 23 up from the one end 27. After the pin 23 is inserted through the hole 5, a first guide roller 31 is rotatably mounted within the bottom of the slot 29, to close it, with a roller pin 33 that extends through the mounting pin 23, transverse to the axis of the mounting pin. The roller pin 33 is long and is mounted in a slot within the support 3, traversing the hole 5, as will be described.

The other end 35 of the mounting pin 23 is spaced above the top surface 19 of the base 9. A stop member 37 is mounted on the other end 35 of the pin 23. The stop member 37 preferably comprises a screw 41 having a head 43 and a threaded shank 45 that is threaded into an opening 47 in the other end 35 of the pin 23. The top end portion 51 of the mounting pin 23 is cut away as shown in FIG. 1 to have parallel sides 53 extending up from shoulders 57.

The stop member 37 and the top end portion 51 of the mounting pin 23 form part of cooperating connector means 55 for detachably connecting a presser plate 61 to the other end of the pin 23. The presser plate 61 is in the form of a disk, as shown in FIG. 1, and has the same general planar shape as the base 9, in the embodiment shown, with parallel sides 63 joined by slightly rounded ends 65. In the center of the plate 61 is a keyhole slot 67 having a part circular portion 69 and a part generally rectangular portion 71. The circular portion 69 is sized to just pass the head 43 of the stop screw 41. The rectangular portion 71 is smaller than the part circular portion 69 and is sized to just receive the cut-away, top end portion 51 of the pin 23. The keyhole slot 67 forms the other part of the cooperating connector means 55 for connecting the presser plate 61 to the pin 23. A plurality of presser plates 61 are preferably provided for the holder, each one matching, in planar shape, an associated base of the same planar shape.

The support 3, in more detail as shown in FIGS. 2 and 3, has a side wall 75 closed by a top wall 77 and a bottom wall 79. The interior of the support 3 is substantially hollow. A support wall 81 extends between the long sides 85 of the side wall 75 across the middle of the support. The hole 5 extends through the middle of the support wall 81. The support wall 81 is broken by a central gap 87. The support wall 81 is also slotted centrally with a first, slot as shown at 89 across the gap 87 and downwardly from the top surface 93 of the side wall 75 through the support wall 81. The first slot 89 is sized to receive the first roller pin 33 therein to prevent rotation of the pin 23, through which the roller pin 33 passes, about its longitudinal axis. The support wall 81 is also slotted on either side of the first slot 89 with second and third slots as shown at 99, 101. The slots 99, 101 are parallel to slot 89 and are only deep enough to receive second and third roller pins 103, 105. The roller pins 103, 105 carry second and third guide rollers 107, 109 thereon. The top wall 77 of the support 3 has depressions 111 in its bottom surface 113 providing clearance for the second and third guide rollers 107, 109 mounted in the side wall 75. The guide rollers 107, 109 are located in the top portion of the central gap 87 in the support wall 81.

Figure 4:
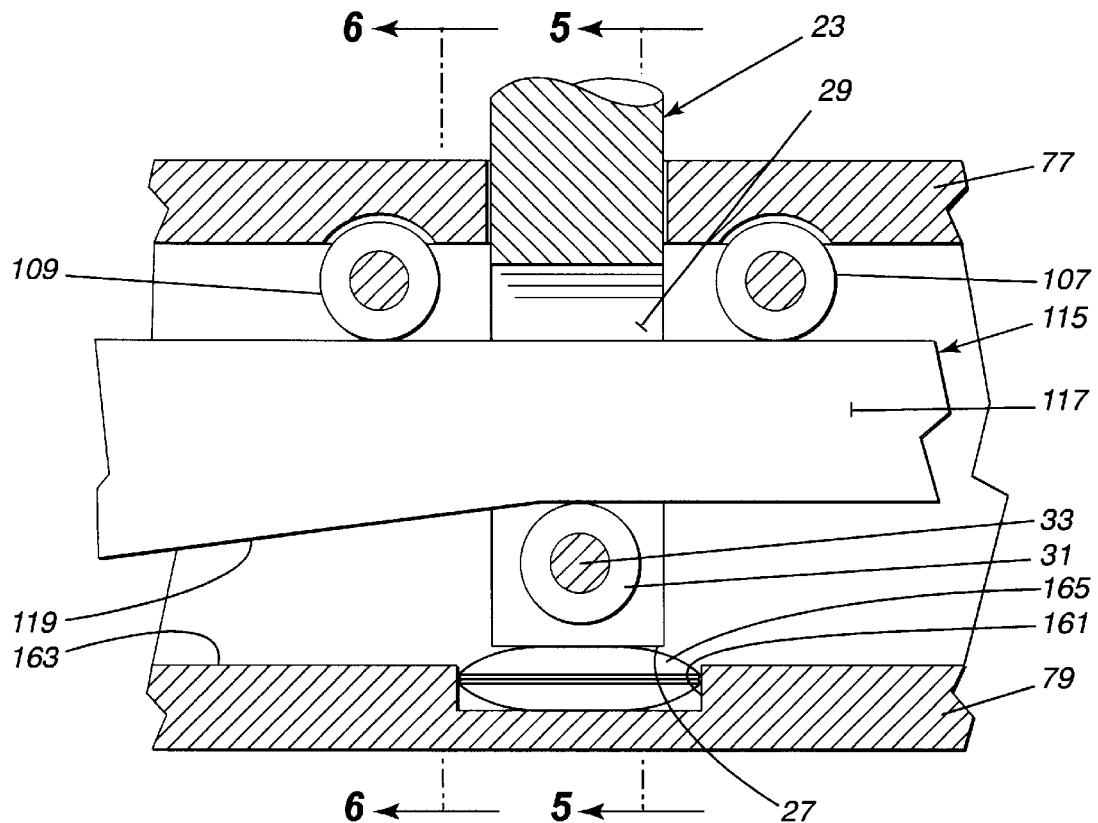
FIG. 4 is cross-section detail view showing the camming member in unlocked position.
Figure 5:
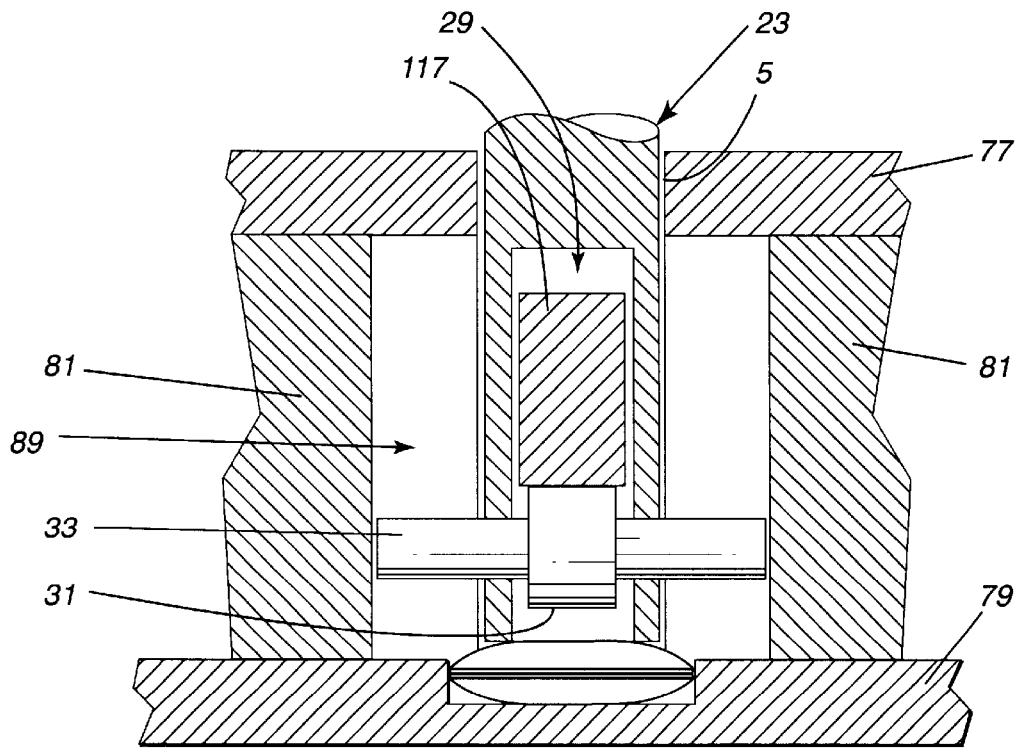
FIG. 5 is a cross-section view taken along line 5—5 in FIG. 4.
Figure 6:
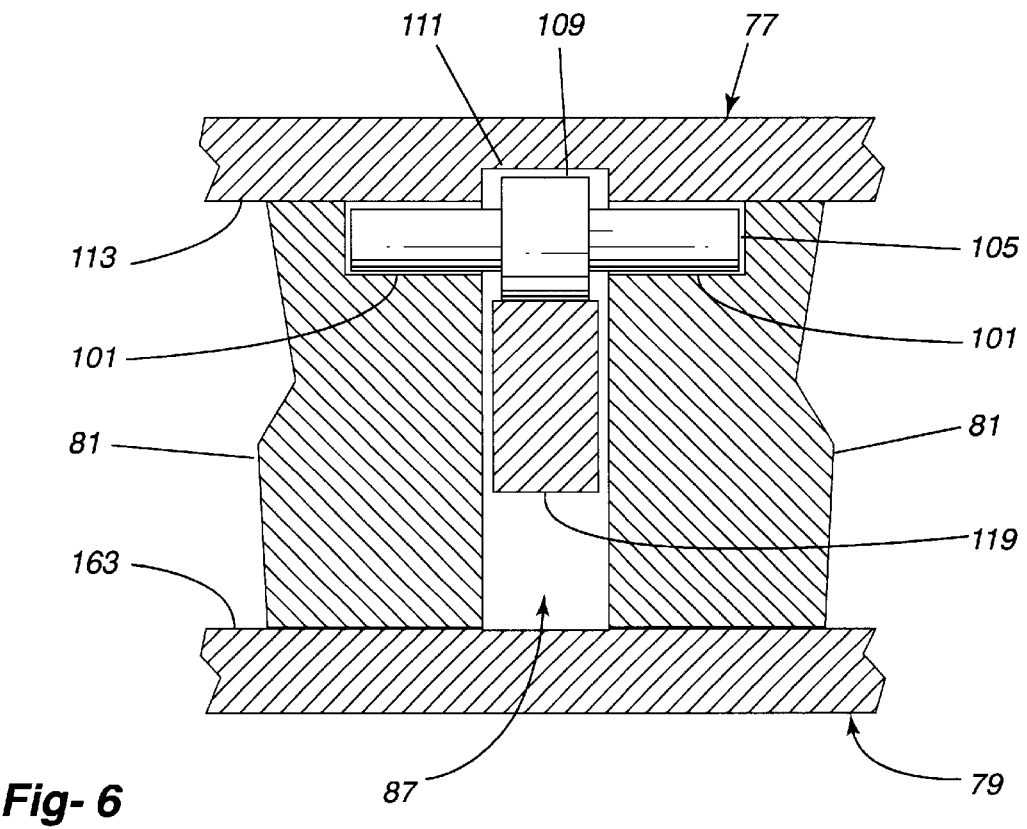
FIG. 6 is a cross-section view taken along line 6—6 in FIG. 4.

Pulling means 115 are provided for pulling the mounting pin 23 downwardly. An elongated cam member 117, forming part of the pulling means 115, is located within the gap 87 in the support 3, as shown in FIGS. 4 to 6, and is connected to the mounting pin 23 by the connecting means 25 on the bottom end of the pin. More particularly, the cam member 117 passes through the slot 29 in the pin 23, riding over the first guide roller 31 in the slot 29 and under the second and third guide rollers 107, 109 mounted in the support wall 81. The start of an angled cam surface 119 on the bottom of the cam member 117 rests on the first guide roller 31 in the pin 23. When the cam member 117 is moved to the left, as shown in FIG. 7, the cam surface 119, acting on the first guide roller 31 in the pin 23, will cam the pin 23 downwardly.

Figure 8:
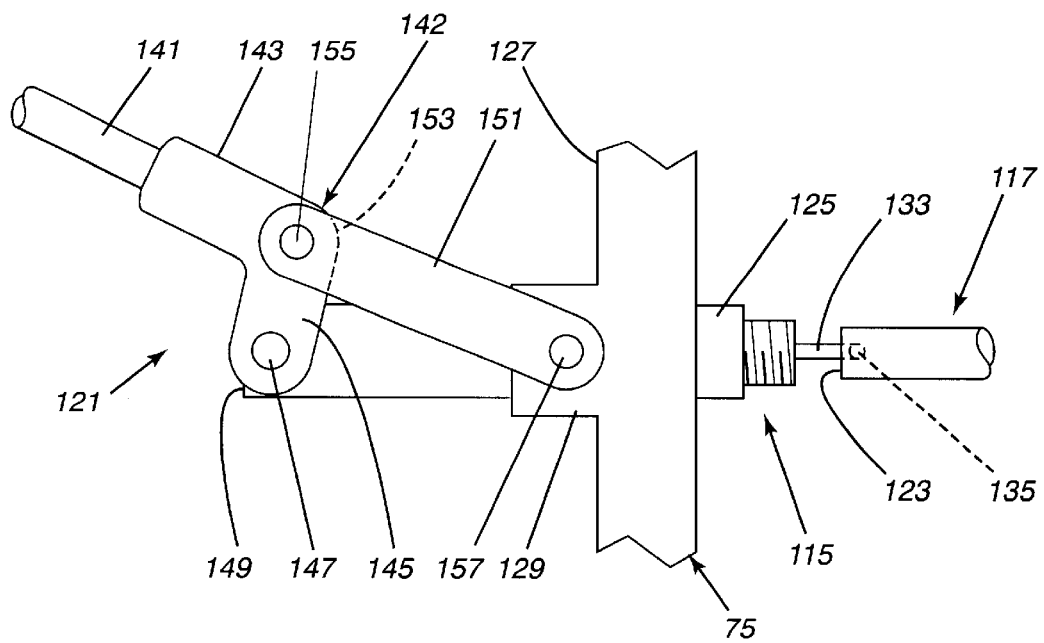
FIG. 8 is a detail plan view of the lever mechanism in the unlocked position.
Figure 9:
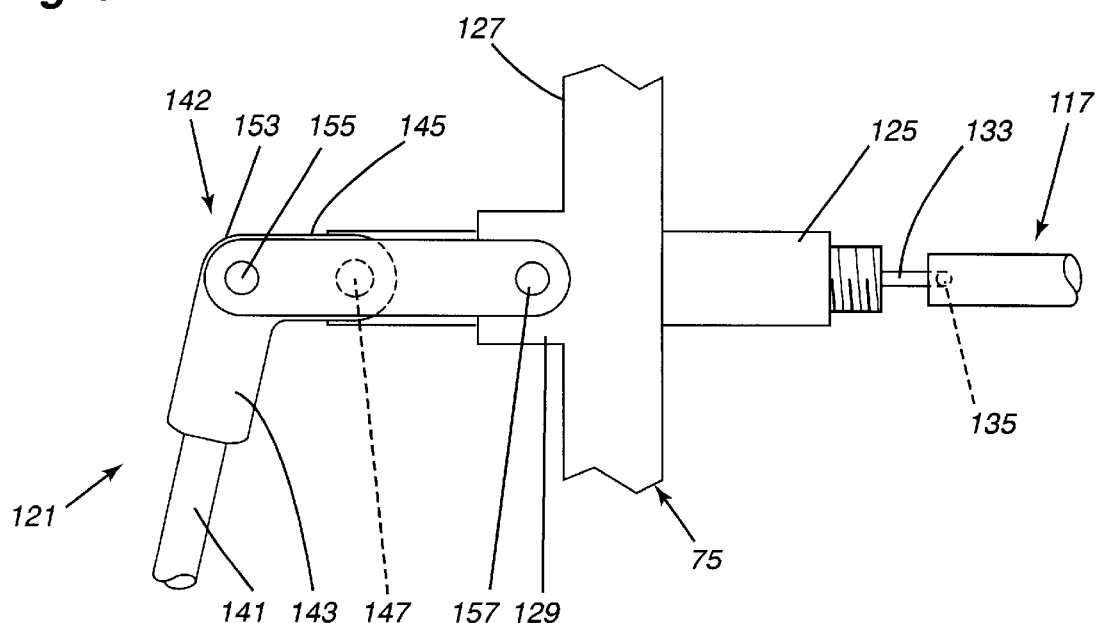
FIG. 9 is a detail plan view with the lever mechanism in the locked position.

The pulling means 115 includes a lever mechanism 121 connected to one end 123 of the cam member 117. The lever mechanism 121, as shown in FIGS. 8 and 9, includes a rod 125 slidable through an opening 126 in the end wall 127 of the sidewall 75 and a boss 129 on the end wall 127. The rod 125 is generally aligned with the cam member 117. A hooked pin 133 on the end of the rod 125 is insertable into a hole 135 in the end 123 of the cam member 117 to connect them together. The lever mechanism 121 has a handle 141 having a right-angled lever 142 at one end. The lever 142 is mounted at the end of one arm 143 to the end of the handle 141. The end of the free arm 145 of the right-angled lever 142 is mounted by a pivot pin 147 to the end 149 of the rod 125. A straight lever arm 151 is pivotably mounted at one end to the corner 153 of the right-angled lever 142 by a pivot pin 155 and at its other end by a pivot pin 157 to the boss 129 on the end wall 125. Pulling the handle 131 of the lever mechanism 121 so that the pivot pin 155 becomes aligned with the rod 125, as shown in FIG. 9, causes the rod 125 to move inwardly and thus moves the cam member 117 to cause it to cam the mounting pin 23 downwardly. The pivot pin 155 can move just past the center line of the rod 125 and in this position locks the mounting pin 23 in its lowered position. The lever mechanism 121 is known.

Figure 7:
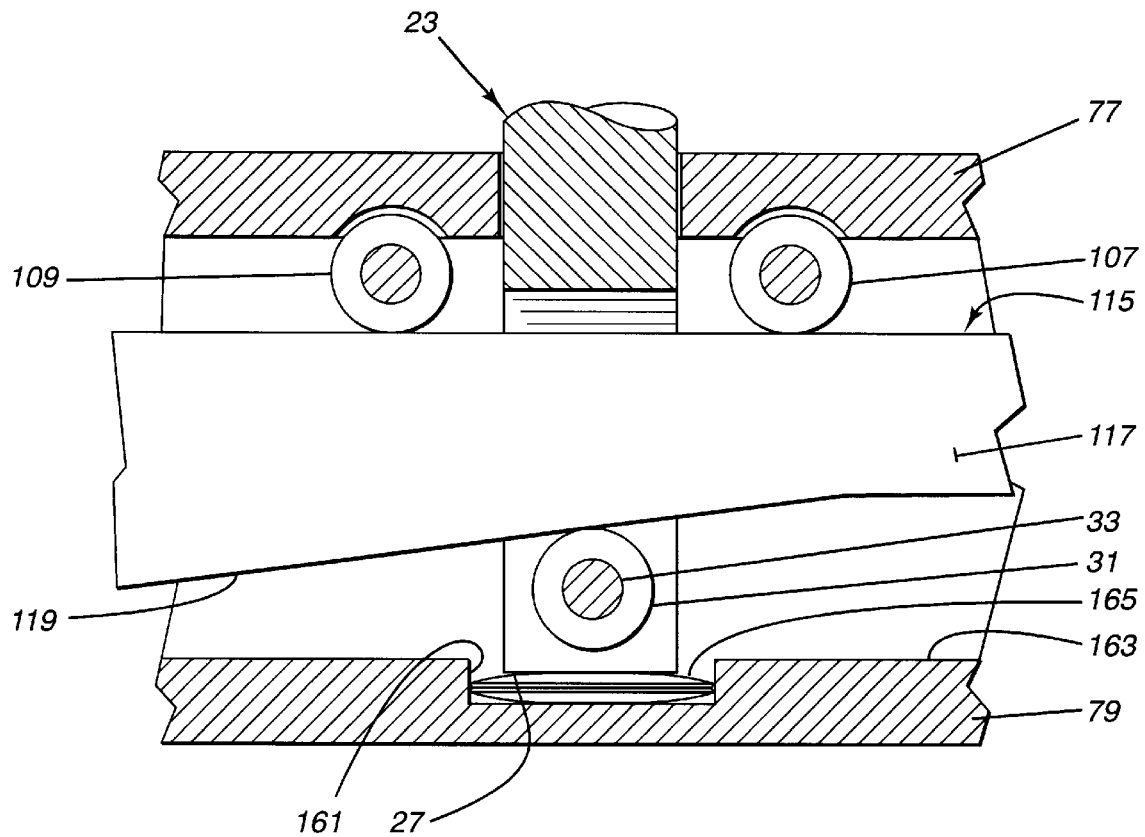
FIG. 7 is a view similar to FIG. 5 but with the camming member in a locked position.

The bottom wall 79 of the support 3 has a shallow circular depression 161 in its top surface 163 located under the pin 23 as shown in FIGS. 4 and 7. Resilient means in the form of one or more spring washers 165 are located in the depression 161. When the pin 23 is pulled down by movement of the handle 141 moving the cam member 117 in one direction, the lower end 27 of the pin 23 contacts and compresses the spring washers 165. When the handle 141 is unlocked after forming the disks to move the cam member 117 in the opposite direction, the spring washers 165 release pushing the pin 23 back up.

Figure 10:
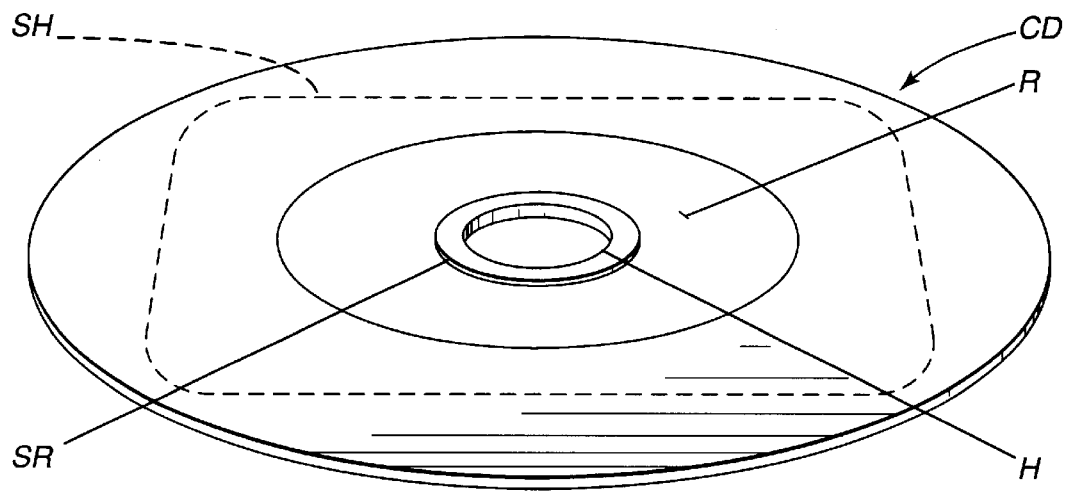
FIG. 10 is a perspective view of a disk before shaping.
Figure 11:
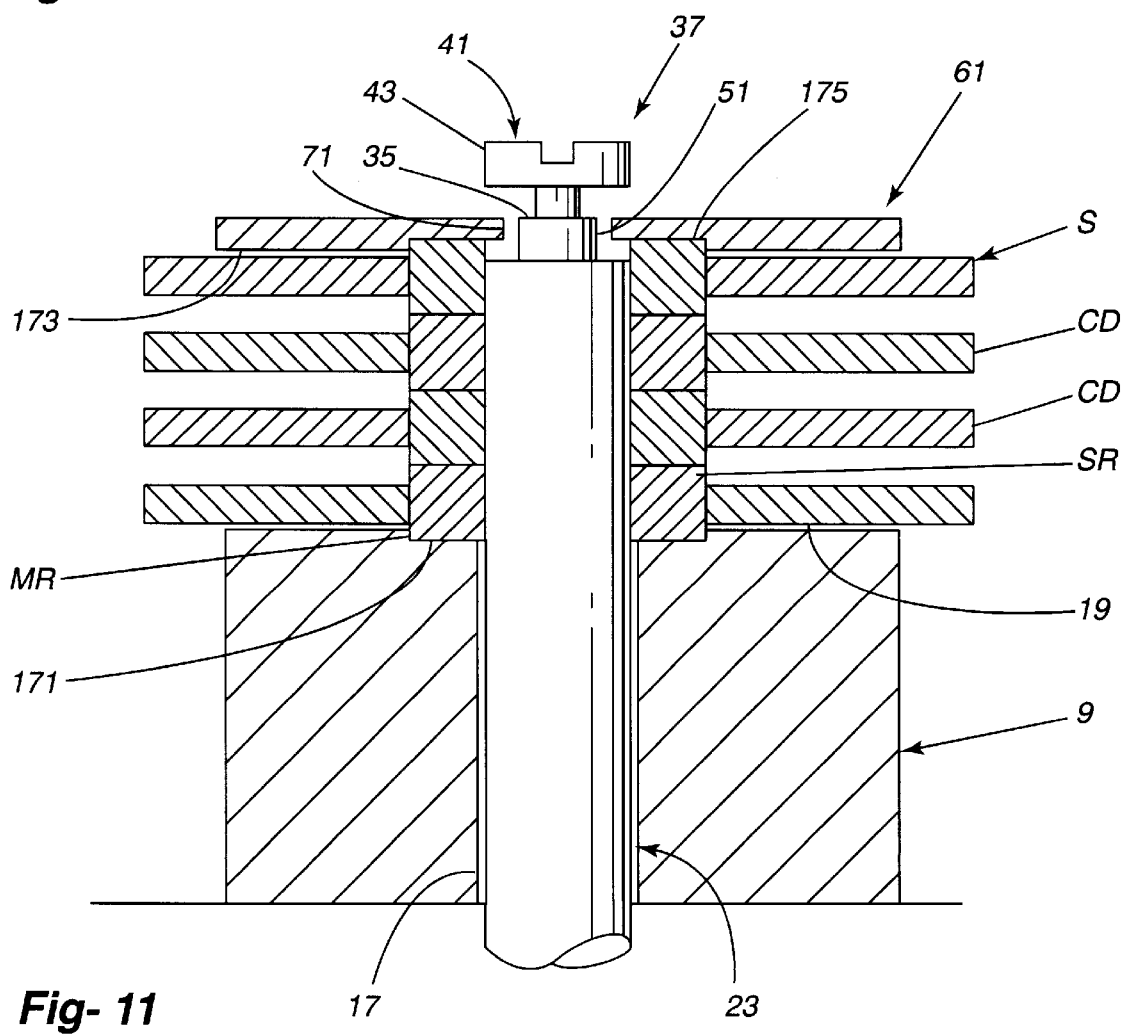
FIG. 11 is a detail cross-section view showing the disks stacked on the holder.

In use, the disk stack holder 1 is placed at a loading station and the presser plate 61 is removed from the mounting pin 23. A stack S of circular disks CD is mounted by their aligned central holes H on the pin 23, the bottom of the stack S resting on the top surface 19 of the base 9 as shown in FIGS. 10 and 11.

The top surface 19 of the base 9 may have a shallow circular depression 171, concentric with the hole 17 for receiving the slight projecting portion of the stacking ring MR on the bottom CD. Each disk CD has an annular region R concentric about the hole H with information thereon. This region R is small enough to fall within the final shape SH, shown in dotted lines, of the disk to be formed from the CD. With the stack S mounted on the pin 23, the presser plate 61 is mounted over the head 43 of the stop screw 41 through the part circular hole 69 and the plate 61 is then moved laterally to located the cutaway portion 51 of the pin 23 in the rectangular portion 71 of the keyhole 67 in the plate 61. The bottom surface of the plate 61 rests on the top CD in the stack S and the plate 61 is aligned with the base 9. The bottom surface 173 of the plate 61 can also have a shallow circular depression 175 therein sized to receive the projecting top portion of the stacking ring MR on the top CD in the stack S. The handle 131 of the lever mechanism 121 is then actuated to pull the cam member 117 through the slot 29 in the pin 23 in one direction camming the pin 23 downwardly a predetermined distance to move the stop member 37 against the presser plate 61 to securely lock the stack S between the plate 61 and the top surface of the base 9. The threaded stop member 37 allows the distance between the presser plate 61 and the base 9 to be adjusted so that force applied to lock the stack S can be precisely determined and then repeated for each stack.

Once the stack S is mounted and locked on the holding means, the loaded holder 1 can be moved from the loading station to a work station where a cutter shapes the held disks. The base 9 is preferably thicker than the stack S of disks CD. This provides clearance for the material cut away from the disks to fall free of the disks thereby facilitating handling of the disks after cutting.

Figure 12:
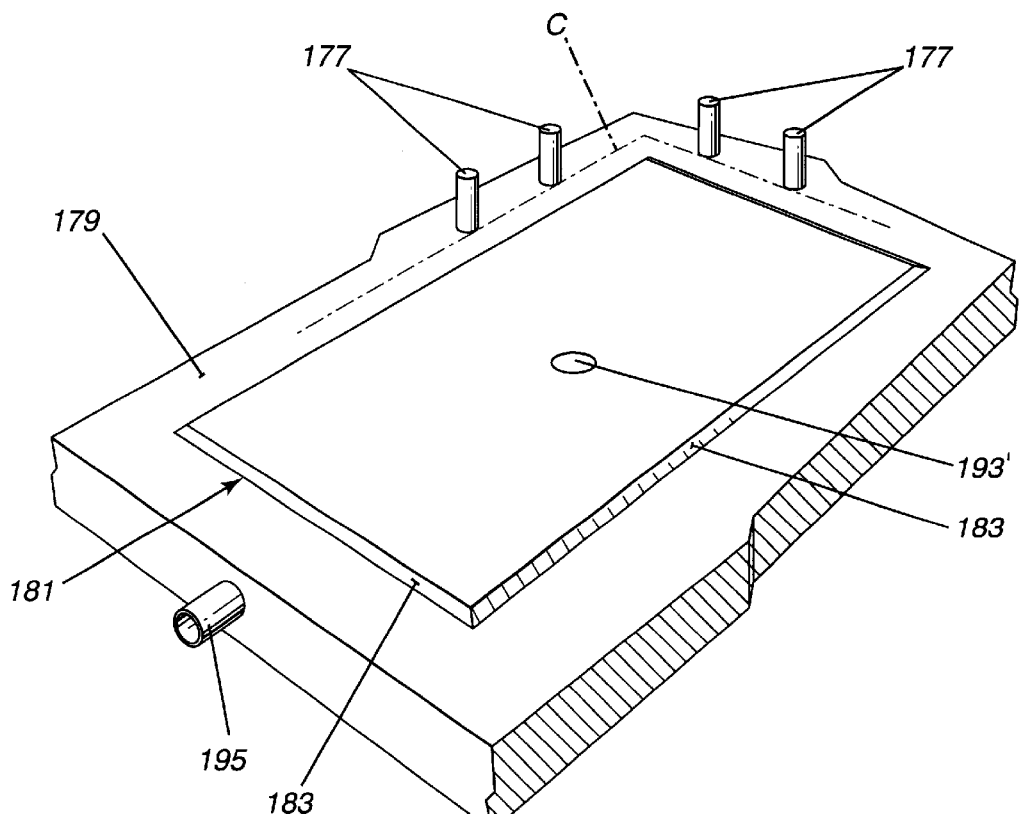
FIG. 12 is a detail perspective view of a work table at a work station.
Figure 13:
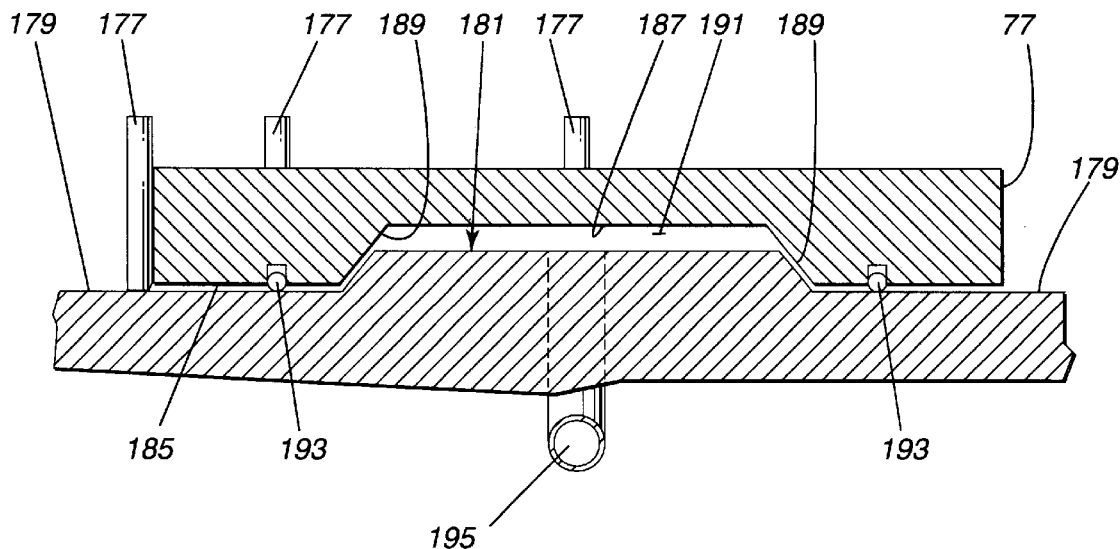
FIG. 13 is a detail cross-section view showing the holder mounted on the work table.

Locating pins 177, defining a corner, can be provided at a work station table 179, as shown in FIGS. 12 and 13 for locating the support 3 of the loaded holder 1, via the periphery of the side wall 75 of the support 3, on a pad 181 on the table 179. The pad has angled side walls 183. A corner of the support 3 is pushed into the corner C defined by the locating pins 177, with the sidles of the support defining its corner pushed against the pins 177 to position it on the pad 181. Other forms of locating means can be used. The bottom surface 185 of the bottom wall 77 of the support 3 has a depression 187 for receiving the pad 181. The depression 187 has angled side walls 189 matching the angle of the pad sidewalls 183, but the depression is slightly deeper than the height of the pad 181. When the support 3 is properly mounted on the pad 181 a thin chamber 191 is formed between them. A seal in the form of an o-ring 193 is mounted in a shoulder 195 formed about the depression 187 part-way up the side walls 189. The shoulder 195 and thus the seal 193 abut the top of the pad 181 sealing the chamber 191. The shoulder 195 is located to have the pad 181 position the support 3 slightly above the table 179 as shown in FIG. 13. An air outlet 197 is provided in the pad 181. The outlet 197 is selectively connected to suction means (not shown) via a line 199. Operation of the suction means will create suction within the chamber 191 to securely hold the holder 1 at the work station. Thus the holder is always located in the proper place at the work station for the cutting tool the CD's are cut with.

The stack S of disks CD are cut at the work station by moving a cutting tool (not shown) relative to the stack. The shape to which the disks are cut to is larger than the size of the selected base 3 and plate 61 employed so as to provide clearance for the cutter. While cutting is taking place at the work station another holder 1 is being loaded at the loading station. After cutting is finished the support with the cut disks is removed from the cutting station for unloading of the disks at an unloading station and another loaded holder is placed in the work station.

The base 9 and presser plate 61 can be provided in sets of various shape. One set could be generally rectangular, as shown. Other sets could be oval or triangular.

While one form of pulling means 115 has been described, other forms could be used as well provided they give a predetermined pull to the pin 23. For example, the lever mechanism 121 could be replaced by a hydraulic cylinder mounted on the support 3 and connected at one end to the cam member 117. Alternatively, a hydraulic cylinder could be mounted axially below the pin 23 to pull the pin directly down dispensing with the cam member 117, the guide rollers 31, 107, 109 and the lever mechanism 121. The work table would have an opening to accommodate the hydraulic cylinder mounted in this manner.

While one form of connector means 55 has been described for use in detachably connecting the presser plate 61 to the other end of the pin 23, other types of connector means could be employed to provide the detachable connection. For example, the presser plate 61 could also be threaded onto the top of the pin 23 to be aligned with the base. The plate could be removed by unthreading it from the pin 23 each time a stack S is to mounted or removed from the pin. Alternatively, the presser plate could always remain on the pin 23, the bottom end of the pin placed through the stack S and then through the holes 5, 17 to connect the bottom end of the pin to the pulling means 115 with the plate aligned with the base.

I claim:

1. A disk stack holder for use in holding a stack of disks; the holder having a support with a base on the support; a pin slidably mounted through aligned holes in the base and support with one end of the pin within the support and the other end of the pin above the base, the pin portion above the base receiving the stack of disks with the stack resting on the base; connecting means at the one end of the pin for use in connecting the pin to a pulling means; a presser plate detachably connected on the other end of the pin, whereby the pulling means can pull the pin pulling the plate toward the base to tightly clamp the stack of disks mounted on the pin between the plate and the base.

2. A holder as claimed in claim 1 including cooperating connector means on the presser plate and the one end of the pin for detachably connecting the presser plate to the pin.

3. A holder as claimed in claim 2 wherein the connector means has: a central opening in the presser plate, a stop member on the other end of the pin, the opening sized at one end to allow the plate to pass over the stop member and when passed thereover and moved laterally, the opening sized at the other end to prevent removal of the plate over the stop, the top portion of the pin shaped to receive the other end of the opening.

4. A holder as claimed in claim 3 wherein the pulling means has a cam member movable transversely of the pin, the cam member passing through a slot in the pin, and a lever mechanism outside the support connected to the cam member to move the cam member transversely of the pin in one direction to cam the pin downwardly a predetermined distance during the cam member movement.

5. A holder as claimed in claim 4 including a guide roller in the slot for retaining the cam member in the slot and supporting it; and a pair of cam rollers on the support on either side of the pin for helping to guide the cam member transversely.

6. A holder as claimed in claim 4 including resilient means in the support for moving the pin upwardly when the cam member is moved in the opposite direction to the one direction.

7. A holder as claimed in claim 3 wherein the stop member is adjustable toward or away from the other end of the pin.

8. A holder as claimed in claim 3 wherein the bottom of the support has a depression for receiving a locating pad at a work station to locate the support in the proper position relative to a tool at the work station; and a seal depression so suction can be applied between the support and the pad to securely hold the support at the work station.

9. A holder as claimed in claim 3 wherein the base and the presser plate have the same general shape when viewed in plan, the presser plate overlying the base when the disk stack is clamped, the base and presser plate slightly smaller than the size the disks are to be cut to.

10. A holder as claimed in claim 9 wherein the base is thicker than the stack of disks to be clamped.

11. A holder as claimed in claim 9 wherein the base is detachably connected to the support so that the base and presser plate are changeable.

12. A holder as claimed in claim 1 wherein the pulling means has a cam member movable transversely of the pin, the cam member passing through a slot in the pin, and a lever mechanism outside the support connected to the cam member to move the cam member transversely of the pin in one direction to cam the pin downwardly a predetermined distance during the cam member movement.

13. A holder as claimed in claim 12 including a guide roller in the slot for retaining the cam member in the slot and supporting it; and a pair of cam rollers on the support on either side of the pin for helping to guide the cam member transversely.

14. A holder as claimed in claim 12 including resilient means in the support for moving the pin upwardly when the cam member is moved in the opposite direction to the one direction.

15. A holder as claimed in claim 1 wherein the bottom of the support has a depression for receiving a locating pad at a work station to locate the support in the proper position relative to a tool at the work station; and a seal in the depression so suction can be applied between the support and the pad to securely hold the support at the work station.

16. A holder as claimed in claim 1 wherein the base and the presser plate have the same general shape when viewed in plan, the presser plate overlying the base when the disk stack is clamped, the base and presser plate slightly smaller than the size the disks are to be cut to.

17. A holder as claimed in claim 16 wherein the base is thicker than the stack of disks to be clamped.

18. A holder as claimed in claim 16 wherein the base is detachably connected to the support so that the base and presser plate are changeable.

* * * * *